United States Patent [19]
Kameda

[11] Patent Number: 4,804,061
[45] Date of Patent: Feb. 14, 1989

[54] POWER TRANSMISSION FOR FOUR WHEEL DRIVE VEHICLE
[75] Inventor: Osamu Kameda, Hiroshima, Japan
[73] Assignee: Mazda Motor Corporation, Hiroshima, Japan
[21] Appl. No.: 145,955
[22] Filed: Jan. 20, 1988
[30] Foreign Application Priority Data
Apr. 27, 1987 [JP] Japan .................................. 62-105878
[51] Int. Cl.$^4$ ............................................. F16H 37/06
[52] U.S. Cl. ................................... 180/247; 180/250; 74/665 GE
[58] Field of Search ................ 180/247, 248, 249, 250, 180/197, 336, 333; 74/665 GA, 665 GE, 705, 674, 740

[56] References Cited
U.S. PATENT DOCUMENTS
4,458,557 7/1984 Hayakawa ........................... 180/247
4,677,873 7/1987 Eastman et al. ...................... 180/250
4,733,574 3/1988 Uchiyama ............................ 180/247

FOREIGN PATENT DOCUMENTS
60-127232 8/1985 Japan .
61-223366 10/1986 Japan .

Primary Examiner—David M. Mitchell
Assistant Examiner—Donn McGiehan
Attorney, Agent, or Firm—Fleit, Jacobson, Cohn & Price

[57] ABSTRACT

A power transmission for a four wheel drive vehicle having a transfer gear assembly consisting of a planetary gear unit, a center-differential gear assembly consisting of a planetary gear unit which is located coaxially relative to and adjacent to the transfer gear assembly, and two shift mechanisms one individual to each gear assembly. One shift mechanism shifts the transfer gear assembly in a desired drive range and is located coaxially relative to and adjacent to the transfer gear assembly opposite to the center-differential gear assembly. The other shift mechanism shifts the center-differential gear assembly and is located coaxially relative to and adjacent to the center-differential opposite to the transfer gear assembly. Each shift mechanism consists of three splined clutch rings disposed coaxially relative to the gears and an axially movable clutch sleeve for selectively engaging with the three clutch rings so as to shift the gear between different operating modes.

13 Claims, 4 Drawing Sheets

2WD-Hi

4WD-Hi
Diff-Free

4WD-Hi
Diff-Locked

4WD-Low
Diff-Locked

POWER TRANSMISSION FOR FOUR WHEEL DRIVE VEHICLE

BACKGROUND OF THE INVENTION

The present invention relates to a power transmission for use on a vehicle equipped with four wheel drive and, more particularly, to a power transmission of the type having a transfer gear and a center-differential gear for driving front and rear wheel driving shafts which are laterally spaced apart and located in parallel with each other.

Power transmissions used on vehicles equipped with four wheel drive include a transfer gear assembly shiftable between different speed drive ranges, a center-differential gear assembly shiftable between different drive modes, and shift mechanisms, one for each gear assembly for shifting the gear assemblies between their different operating positions. As is well known to those skilled in the art, the transfer gear assembly is shifted between a high speed and a low speed drive range, and the center-differential gear assembly is shifted between two wheel drive mode (which is hereinafter noted by 2WD on descriptive listings) and four wheel drive mode (which is hereinafter noted by 4WD on descriptive listings) and between differential-free drive mode (which is hereinafter noted by Diff-Free on descriptive listings) wherein front and rear wheel drive shafts are driven at the same time but allowed to turn at different speeds and differential-locked drive mode (which is hereinafter noted by Diff-Locked) wherein the front and rear wheel drive shafts are driven at the same time and at the same speed.

One disadvantage associated with these known power transmissions is that they tend to be quite complex in construction and long in axial length, thereby making the power transmissions unfavorable and difficult to be installed on vehicles. In an attempt at overcoming such a disadvantage of this type of power transmission, some transfer and centerdifferential gear assemblies are designed to utilize advantageous constructional feature of planetary gear units to devise a power transmission which is simpler in construction and shorter in overall axial length. One such power transmission is disclosed in, for example, Japanese Patent Unexamined Publication No. 61-223,366, entitled "Power Transmission for a Four Wheel Drive Vehicle," laid open Oct. 3, 1986. This power transmission is, however, still relatively complex in its mechanisms because the planetary gear units used as the transfer and the center-differential gear assemblies are partly shared by the two gears. Specifically, shifting the power transmission between different drive modes has to be effected by three shift mechanisms individually operated. Due to the provision of three shift mechanisms, the power transmission is still complex in construction and long in overall axial length.

In addition to the complexity of the power transmission, there is an operational problem associated with the power transmission. The shift mechanism for the center-differential gear assembly of a conventional power transmission generally consists of three clutch ring members axially spaced and located coaxially relative to the planetary gear unit and an axially movable clutch sleeve selectively engageable with the three clutch ring members.

Where the shift mechanism is to cooperate with the center-differential gear assembly of the power transmission, there is a design requirement that each clutch gear ring member has to be given a certain rotational play either on a drive shaft or on a sleeve on which the clutch ring members are mounted for rotation. This particular requirement is necessitated by a feature of this shifting mechanism, namely, that relative rotational phases of the respective clutch ring members change uncertainly and independently during rotation. If each clutch ring member is given no rotational play, it is quite difficult to bring smoothly the clutch sleeve into and out of engagement with any one of the three clutch ring members during rotation, resulting in a troublesome drive mode shift operation of the power transmission.

OBJECT OF THE INVENTION

It is, therefore, an object of the present invention to provide an improved power transmission of the type having front and rear wheel drive shafts laterally spaced and disposed in parallel with each other, a transfer gear assembly and a center-differential gear assembly used on a vehicle equipped with four wheel drive which is simple and compact in construction.

It is another object of the present invention to provide a power transmission of the type having a center-differential gear assembly and a shift mechanism for shifting the centerdifferential gear assembly between different drive modes which ensures a smooth, certain drive mode shift operation of the shift mechanism.

SUMMARY OF THE INVENTION

These and other objects and features of the present invention are accomplished by providing a novel power transmission which includes a transfer gear assembly shiftable between a high and a low speed drive range, a center-differential gear assembly shiftable between 2WD and 4WD modes, or Diff-Free and Diff-Locked drive modes, and first and second shift mechanisms, one individual to each gear assembly. Each of the transfer gear assembly and the center-differential gear assembly basically consist of a planetary gear assembly which is short in axial overall length.

It is a feature of the present invention that these planetary gear assemblies are located coaxially with and adjacent to each other and that on one side of the transfer gear assembly the first shift mechanism is disposed, opposite to the center-differential gear assembly, and on one side of the center-differential gear assembly the second shift mechanism is disposed, opposite to the transfer gear assembly. Due to this coaxial arrangement, the power transmission becomes short in overall axial length, as well as simple and compact in construction.

In a specific embodiment of the present invention, the shift mechanism associated with the center-differential gear assembly consists of three, namely, first, second and third, clutch ring members axially spaced and located coaxially relative to the center-differential gear assembly and a sleeve clutch member which is axially movable selectively to engage with the clutch ring members. The first and second clutch ring members are integrally coupled to first and second output members of the center-differential gear assembly, the first output member being operationally coupled to the rear wheel drive shaft of the power transmission; the third clutch member is operationally coupled to the front wheel drive shaft of the power transmission. According to the power transmission embodying the present invention, between the second output member and the rear output shaft and the front output shaft there is provided an appropriate rotational play by the aid of which the sleeve clutch member can be certainly brought into and out of engagement with the clutch ring members. This results in a certain and smooth drive mode shift operation of the center-differential gear assembly.

The foregoing and other objects, features and advantages of the present invention will be understood more clearly and fully from the following detailed description of the preferred embodiment with reference to the accompanying drawings.

DETAILED DESCRIPTION OF THE INVENTION

A power transmission according to a preferred embodiment of the present invention incorporates various elements, in particular, an engine, a main-transmission, front and rear axle assemblies and so forth, similar to those of conventional power trains. Because such elements are well known to those skilled in the art, this description will be directed in particular to elements forming part of, or cooperating directly with, the novelty of the power transmission embodying the present invention. It is to be understood that power transmission elements not specifically shown or described herein which form part of the claimed combination may be selected from those known in the art.

Figure 1:
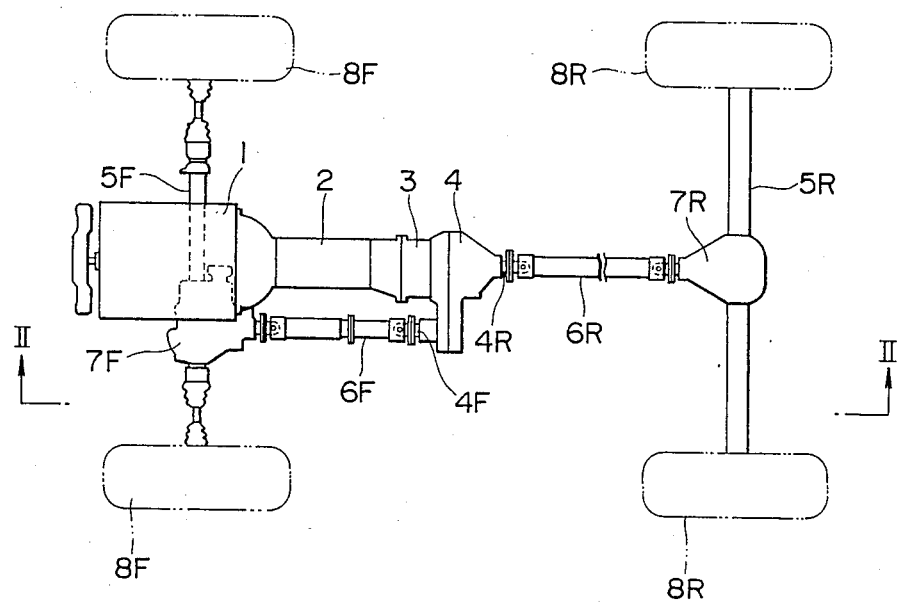
FIG. 1 is a schematic plan view showing a power train for a four wheel drive vehicle embodying the present invention.
Figure 2:
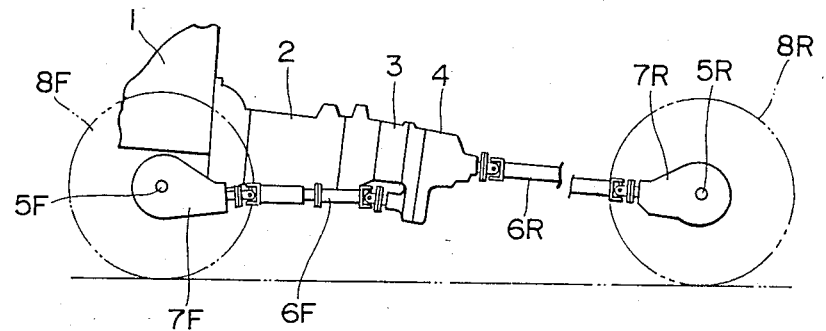
FIG. 2 is a schematic elevational view of the power train taken along a line II—II of FIG. 1.

Referring now to the drawings, wherein like reference characters designate corresponding or similar parts or elements throughout the several views, there is generally schematically shown in FIGS. 1 and 2 a power train on a vehicle equipped with four wheel drive which has an engine unit 1, a primary- or main-transmission assembly 2, a secondary-transmission or transfer gear assembly 3, and a center-differential gear assembly 4 arranged in order from the front side of the vehicle. A rear wheel drive shaft or rear output shaft 4R of the center-differential 4 is coupled to a rear axle shaft 5R through a rear propeller shaft 6R and a rear axle differential gear 7R by which a pair of rear wheels 8R are turned differentially. A front wheel drive shaft or front output shaft 4F of the center-differential gear assembly 4, which is laterally spaced from and located in parallel with the rear output shaft 4R, is coupled to a front axle shaft 5F through a front propeller shaft 6F and a front axle differential gear 7F by which a pair of front wheels 8F are turned differentially. As is generally well known to those skilled in the art, each propeller shaft 6R, 6F is coupled at both ends to the output shaft 4R, 4F and the axle differential gear 7R, 7F by means of universal joints.

Figure 3:
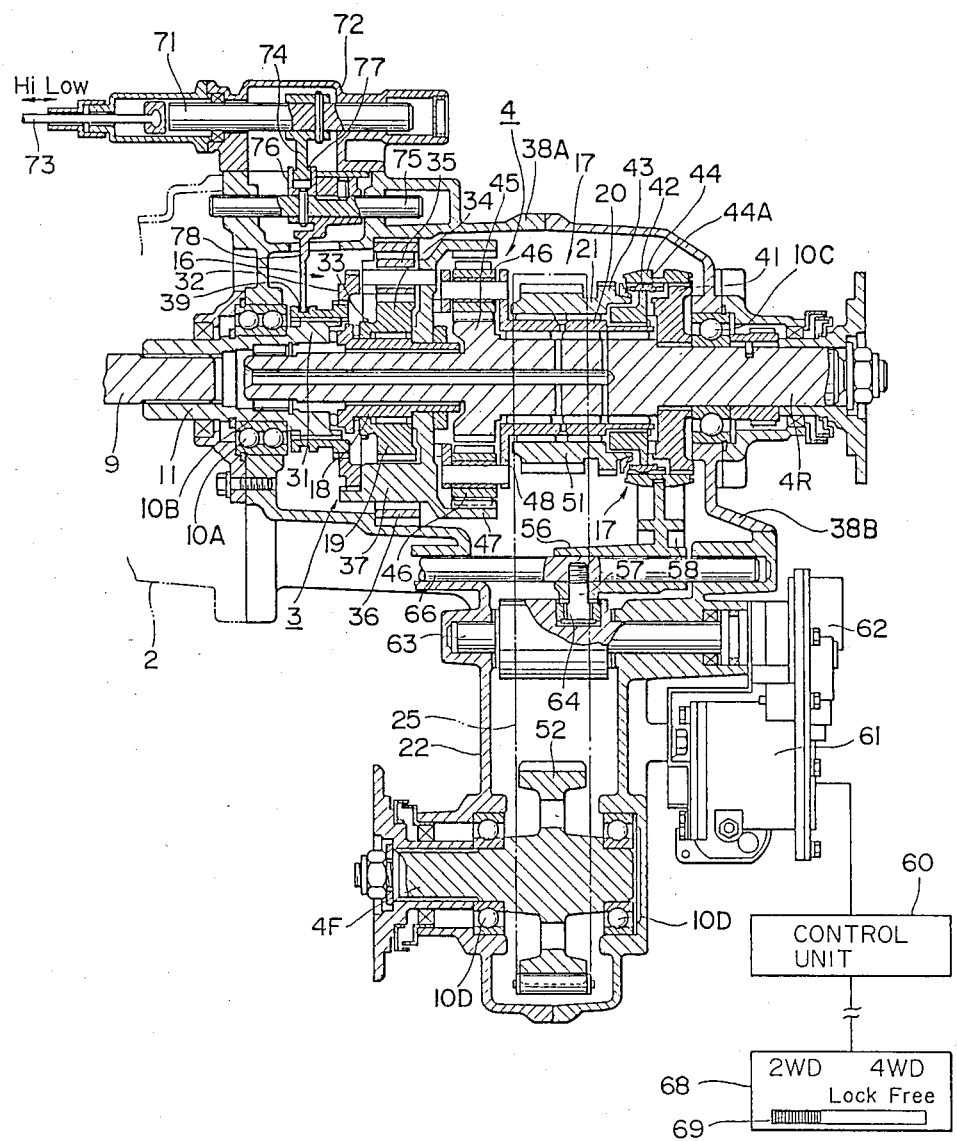
FIG. 3 is a sectional view showing details of the transfer and center-differential gear assemblies of the power transmission of the vehicle equipped with four wheel drive of this invention which is in the 2WD-Hi drive mode.

Referring now to FIG. 3, shown therein in longitudinal section is a part of the power transmission including the transfer gear assembly 3 and the center-differential gear assembly 4, each of which basically comprises a planetary gear assembly. This power transmission has three rotatable shafts, namely, a transfer input shaft 11 in the form of a hollow tube which is supported by a ball bearing 10A held in a front-half gear casing 38A for rotation and is spline-coupled to an output shaft 9 of the primary-transmission assembly 2; the rear output shaft 4R located coaxially relative to the transfer input shaft 11 and supported at its one end by a needle bearing 10B held in the transfer input shaft 11 and at its opposite end by a ball bearing 10C held in a rear-half gear casing 38B for rotation; and the front output shaft 4F laterally spaced from and located in parallel with both of the transfer input shaft 11 and the rear output shaft 4R and supported by a pair of ball bearings 10D held in an extension 22 formed by portions of the front-half and rear-half gear casings 38A and 38B. The transfer gear assembly 3 and the center-differential gear assembly 4 which will be described in detail later are mounted on the rear output shaft 4R. Arranged coaxially with the transfer gear assembly 3 and the center-differential gear assembly 4 are two shift mechanisms, namely, first shift mechanism 16 in cooperation with the transfer gear assembly 3 on the front or left side of the transfer gear assembly 3 and second shift mechanism 17 in cooperation with the center-differential gear assembly 4 on the rear or right side of the center-differential gear assembly 4, as shown in FIG. 3.

The transfer gear assembly 3 which is selectively shiftable into a desired driving range, namely, a low speed drive range or a high speed drive range, to transmit driving power with or without torque multiplication from the primary-transmission gear assembly 2 to the center-differential gear assembly 4, consists of first planetary gear assembly having a ring gear 36 fixed to the front-half gear casing 38A, a sun gear 34 mounted on first sleeve shaft 18 spline-coupled to the rear output shaft 4R for rotation, and pinion gears 35 rotatably supported by a carrier member 37 fixed to the first sleeve shaft 18.

Figure 4:
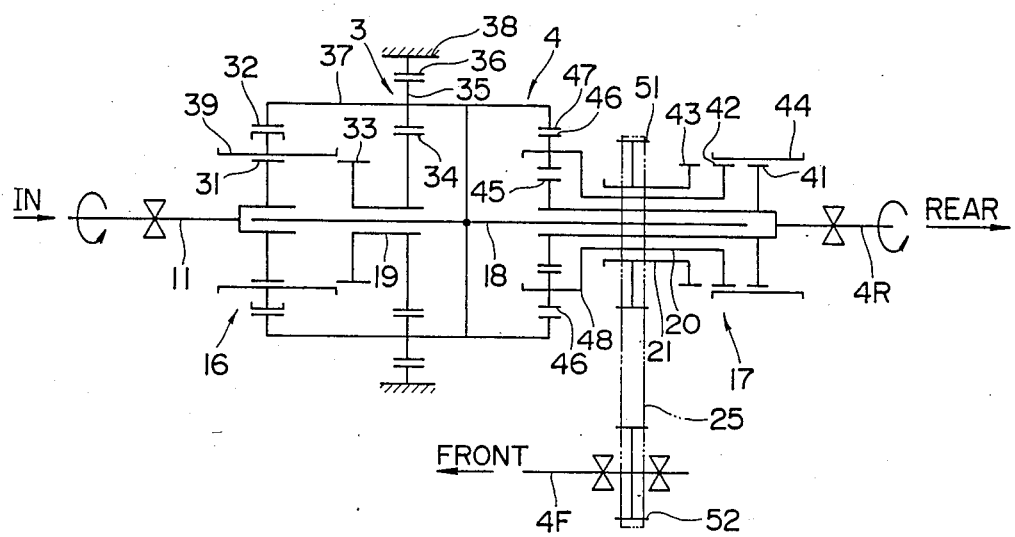
FIG. 4 is a skeleton diagram showing the power transmission of FIG. 1.

On the front side of the transfer gear assembly 3, there is the first shift mechanism 16 for shifting the transfer gear assembly 3 between two different drive ranges, namely, the low speed drive range and the high speed drive range. This first shift mechanism 16, which basically takes the form of a sleeve clutch mechanism, consists of first externally-splined clutch ring 31 formed at one end portion of the transfer input shaft 11, second internally-splined clutch ring 32 spline-coupled to the carrier member 37 of the first planetary gear assembly, third externally-splined clutch ring 33 formed on the sun gear 34 of the first planetary gear assembly, and first splined clutch sleeve 39 spline-coupled to the first clutch ring 31 for axial movement. This first clutch sleeve 31 is axially movable to be selectively brought into spline engagement with the second o the third clutch ring 32 or 33, respectively. When the first clutch sleeve 39 is axially displaced and placed in position as shown in FIGS. 3 and 4, the first clutch sleeve 39 engages with the second clutch ring 32 so as to couple the first and second clutch rings 31 and 32 and thereby to lock together the transfer input shaft 11 and the pinion gears 35 of the first planetary gear assembly; the transfer gear assembly 3 is shifted into the high speed drive range (which is hereinafter noted by Hi on descriptive listings). At this time, the transfer input shaft 11 and the center-differential gear assembly 4 are locked together through the carrier member 37 with which the second clutch ring 32 is integrally formed. This gives direct drive between the transfer input shaft 11 and the center-differential gear assembly 4 through the transfer gear assembly 3.

On the other hand, when the first clutch sleeve 39 is moved axially toward the transfer gear assembly 3 until having disengaged over the second clutch ring 32, the first clutch sleeve 39 is brought into spline-engagement with the third clutch ring 33 so as to couple the first and third clutch rings 31 and 33 (see FIG. 7); the transfer gear assembly 3 is shifted into the low speed drive range (which is hereinafter noted by Lo on descriptive listings) so as to transmit driving power with a torque multiplication from the transfer input shaft 11 of the transfer gear assembly 3, specifically the sun gear 34 to the ring gear 36 through the pinion gears 35, thereby to the center-differential gear assembly 4 in cooperation with the carrier member 37 of the first planetary gear assembly as the transfer gear assembly 3. The center-differential gear assembly 4, which can drive both the rear and front axles at the same time but allows them to turn at different speeds as is well known in the art, consists of a second planetary gear assembly that comprises a sun gear 45 formed integrally with a periphery of the middle section of the rear output shaft 4R; a ring gear 47 formed integrally with the rear end portion of the carrier member 37 of the first planetary gear assembly, and pinion gears 46 rotatably attached to carrier member 48 which is integral with third sleeve shaft 20 mounted on the rear output shaft 4R for rotation.

On the rear side of the center-differential gear assembly 4, there is the second shift mechanism 17 which shifts the center-differential gear assembly 4 between differential-free and -locked drive modes, or between the 2WD and 4WD drive modes. This second shift mechanism 17 consists of fourth externally splined clutch ring 41 spline-coupled to the rear output shaft 4R, fifth externally splined clutch ring 42 spline-coupled to the third sleeve shaft 20 which is spline-coupled to the rear output shaft 4R, sixth externally splined clutch ring 43 formed integrally with fourth sleeve shaft 21 which is mounted on the third sleeve shaft 25 for rotation, and second clutch sleeve 44. This second clutch sleeve 44, which is spline-coupled to the fifth clutch gear 42, is axially movable to selectively engage with the fourth clutch ring 41 or the sixth clutch ring 43 so a to shift the center-differential gear assembly 4 into a desired drive mode. The fourth sleeve shaft 21 is integrally formed with a driving chain sprocket wheel 51 which is connected to a driven chain sprocket wheel 52 formed integrally with the front output shaft 4F by means of a chain 25 (shown by a dotted line in FIG. 3).

This second shift mechanism 17 can shift the center-differential gear assembly 4 into three different drive modes, namely, 2WD drive mode, 4WD-Diff-Free drive mode, and 4WD-Diff-Locked drive mode.

When the second shift mechanism 17 is ready for selecting the 2WD drive mode as is shown in FIGS. 3 and 4, the second clutch sleeve 44 is in engagement with the fourth and fifth clutch rings 41 and 42 and, on the other hand, in disengagement over the sixth clutch ring 43. Under this 2WD drive mode, the sun gear 45 and the pinion gears 46 of the second planetary gear assembly are locked together, transmitting driving torque from the ring gear 47 of the second planetary gear assembly directly to the rear output shaft 4R.

Figure 5:
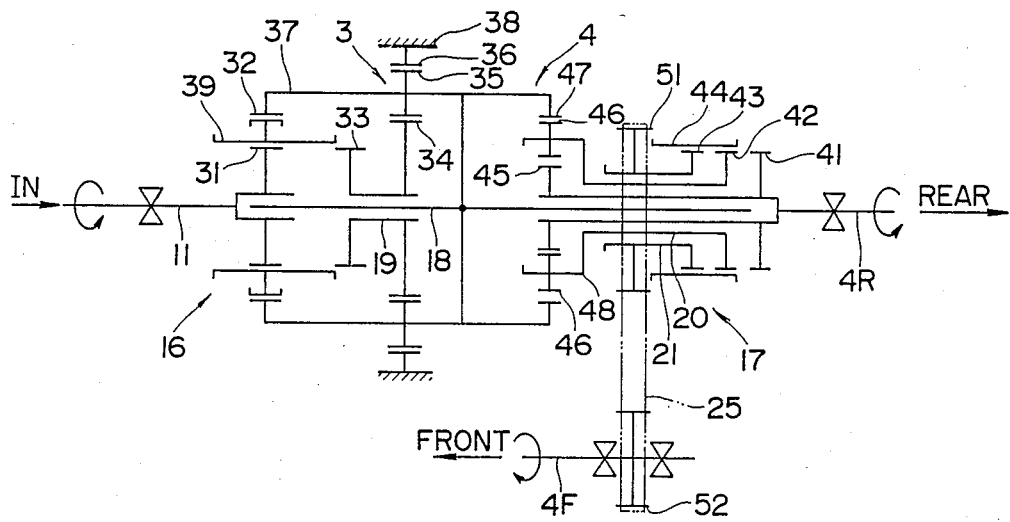
FIG. 5 is a skeleton diagram showing the power transmission which is in the 4WD-Hi-Diff-Free drive mode.

When the second shift mechanism 17 is ready for 4WD-Diff-Free drive mode, the second clutch sleeve 44 is brought into spline engagement with the fifth and sixth clutch rings 42 and 43 but out of engagement over the fourth clutch ring 41 as is shown in FIG. 5. Therefore, the third and fourth sleeve shafts 20 and 21 are locked together through the fifth and sixth clutch rings 42 and 43 to shift the centerdifferential gear assembly 4 into 4WD-Diff--Free drive mode. As a result, the center-differential gear assembly 4 allows the front and rear output shafts 4F and 4R to turn at different speeds when negotiating turn.

Figure 6:
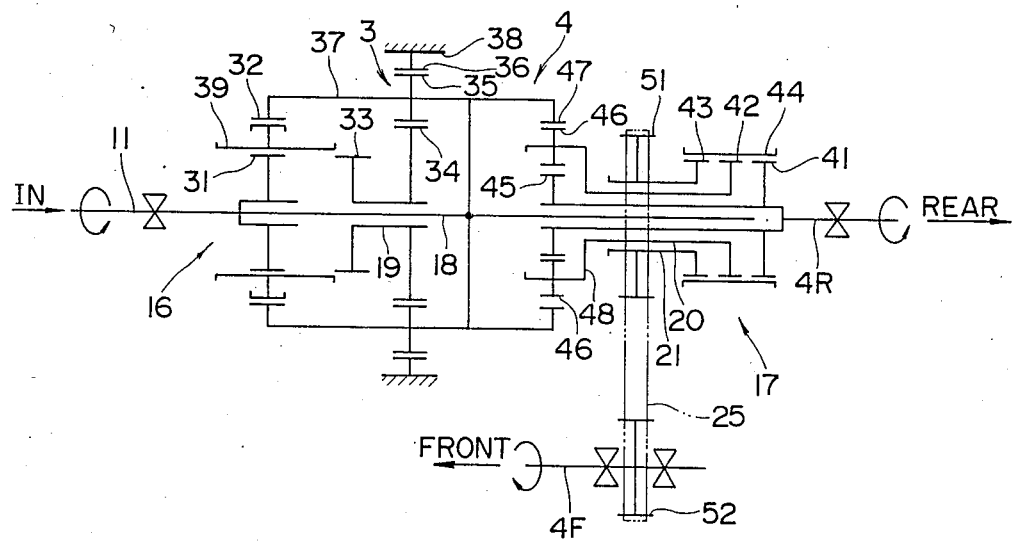
FIG. 6 is a skeleton diagram showing the power transmission which is in the 4WD-Hi-Diff-Locked drive mode.

When the shift mechanism 17 is ready for the 4WD-DiffLocked drive mode, the second clutch sleeve 44 is placed in engagement with all the three clutch rings, namely, the fourth, fifth and sixth clutch rings 41, 42 and 43 as is shown in FIG. 6. Under this 4WD-Diff-Locked drive mode, the third and fourth sleeve shafts 20 and 21 are locked together to maintain the center-differential gear assembly 4 in the 4WD mode. Simultaneously, since the rear output shaft 4R and the third sleeve shaft 20 are locked together, the center-differential gear assembly 4 is shifted into the differential-locked drive mode. As a result, the center-differential gear assembly 4 drives the front and rear output shafts 4F and 4R at the same time but prevents them from turning at different speeds.

As can be understood from the above description, since the fourth clutch ring 41 is spline-coupled to the rear output shaft 4R with which the sun gear 45 of the center-differential gear assembly 3 is integrally formed and the sixth clutch ring 42 is spline-coupled to the third sleeve shaft 20 to which the pinion gears 46 of the second planetary gear assembly are fixed by the integrally formed carrier member 48, the fourth and fifth clutch rings 41 and 42 are allowed to make a relative turn slightly either in opposite directions or the same direction with respect to each other by the aid of back lash given between the sun gear 45 and the pinion gears 46 of the second planetary gear assembly. Due to this relative turn between the fourth and fifth clutch rings 41 and 42, the second clutch sleeve 44 can be smoothly and easily brought into spline engagement with the fourth clutch gear 41 so as to couple together the sun gear 45 and the pinion gears 46 of the second planetary gear assembly serving as the center-differential gear assembly 4. On the other hand, since the fourth sleeve shaft 21 having the sixth clutch ring 43 formed integrally therewith is mounted o the third sleeve shaft 20 having the fifth clutch ring 42 for rotation, the fifth and sixth clutch rings 42 and 43 are also allowed to make a relative turn with respect to each other by the aid of a rotational play produced between the third and fourth sleeve shafts 20 and 21. Due to this relative turn between the third and fourth sleeve shafts 20 and 21, the second clutch sleeve 44 can be easily and smoothly brought into spline engagement with the sixth clutch ring 43 and, simultaneously, brought out of engagement over the fourth clutch ring 41 so as to couple together the pinion gears 46 of the second planetary gear assembly as an output member of the center-differential gear assembly 4 and the driving chain sprocket wheel 51, and hence the front output shaft 4F through the driven chain sprocket wheel 52.

Referring again to FIG. 3, for effecting the above-described drive range shifting of the transfer gear assembly 3, there may be a shift lever such as a column shift lever provided on a steering column or a floor shift lever (not shown) operative from a driver's compartment of the vehicle and which may have, as is well known, two operating positions, namely, a low speed drive range selecting position and a high speed drive range selecting position. A wire 73 connects the shift lever to a shift control rod 71 which is supported within an extension 72 of the front-half gear casing 38A for axial movement. Fixedly mounted on the shift control rod 71 is a connecting pin 74 extending downwardly.

Disposed in juxtaposition with the shift control rod 71 is a supporting rail 75 supported in the extension 72 of the front half gear casing 38A for axial movement. The supporting rod 75 carries an annular sleeve member 76 formed with a peripheral groove 77 which is engaged by the connecting pin 74 of the shift control rod 71 and which has a shift fork 78 extending radially downwardly. As seen in FIG. 3, the shift fork 78 of the sleeve member 76 is in circumferential slidable engagement with an annular groove 39A formed in the periphery of the first clutch sleeve 39 of the first shift mechanism.

When the shift lever in the driver's compartment is manipulated and moved to the high speed driving range selecting position, the shift control rod 71 is displaced axially to move the first clutch sleeve 39 of the first shift mechanism in position (shown in FIG. 3), placing the first and second clutch rings 31 and 32, namely, coupling together the transfer input shaft 11 and the carrier member of the first planetary gear assembly, thereby shifting the transfer gear assembly 3 into the high speed drive range; Hi.

On the other hand, when the shift lever in the driver's compartment is operated or reversed to the low range gear selecting position, the shift control rod 71 is displaced axially rearwardly to move the first clutch sleeve 39 of the first shift mechanism rearwardly in position so as to disengage the first clutch ring 31 over the second clutch ring 32 but to place the first clutch ring 31 and the third clutch ring 33 in spline-engagement, namely, coupling together the transfer input shaft 11 and the sun gear 34 of the first planetary gear assembly, thereby shifting the transfer gear assembly 3 into the low speed drive range; Lo.

For shifting the center-differential gear assembly 4 between the three different drive modes by means of the second shift mechanism 17, there is provided a control unit 60 for controlling a high power reversible electric motor 61 with its associated reduction gear 62 which cooperates with a shift control rod 63 supported by the rear-half gear casing 38B for rotation and having a cam groove 64 formed on its outer periphery thereof. Placed in juxtaposition with the shift control rod 63 is a guide rod 66 on which a sleeve member 56 is fixedly attached. The sleeve member 56 is provided with a connecting pin 57 by which the cam groove 64 of the shift control rod 63 is slidably engaged and a fork member 58, the connecting pin 57 and fork member 58 being axially spaced from and extending radially oppositely to each other. The fork member 58 is in circumferential slidable engagement with an annular groove 44A formed on a periphery of the second clutch sleeve 44 of the second shift mechanism 17.

For effecting the above-described drive mode shifting of the center-differential gear assembly 4, there is a switch board 68 having a shift switch 69 operative from the driver's compartment of the vehicle and which may have three switching positions, namely, a 2WD drive mode selecting position, a 4WD, Diff-Free drive mode selecting position, and a 4WD, Diff-Locked drive mode selecting position.

When the shift switch 69 of the switching board 68 in the driver's compartment is operated, the electric motor 61 is actuated through the control unit 60 to rotate the shift control rod 63 through the reduction gear 62, axially displacing the guide rod 66 with the sleeve member 56 fixed thereto through the sliding engagement between the connecting pin 57 and the cam groove 64 so as to axially displace the clutch sleeve 44 of the second shift mechanism 17. As a result, the second clutch sleeve 44 spline-coupled to the fifth clutch ring 42 is axially displaced to be selectively brought into spline engagement either with the fourth clutch ring 41 fixed to the rear output shaft 4R, or with the sixth clutch ring 43 of the fourth hollow sleeve shaft 21, or with both according to the selected position of the switching knob 69.

When the shift switch 69 is operated to select the 2WD drive mode, the sleeve clutch 44 of the second shift mechanism 17 is displaced rearwardly and brought into spline engagement with the fourth clutch ring 41 spline-coupled to the rear output shaft 4R formed with the sun gear 45 of the second planetary gear assembly as is shown in FIGS. 3 and 4, coupling together the rear output shaft 4R and the carrier member 48, namely, the second output member, of the centerdifferential gear assembly 4. The center-differential gear assembly 4 is rendered to transmit driving power only to the rear output shaft 4R. This power line gives the 2WD drive mode.

On the other hand, when the switching knob 69 is operated to select the 4WD-Diff-Free drive mode selecting position, the second sleeve clutch 44 of the second shift mechanism 17 is then displaced forwardly and brought into spline engagement with the sixth clutch ring 43 of the driving chain sprocket wheel 51 while disengagement over the fourth clutch ring 41 as is shown in FIG. 5, coupling together the carrier member 48, namely, the second output member, of the center-differential gear assembly 4 and the driving chain sprocket wheel 51; the center-differential gear assembly 4 transmits driving power to the front output shaft 4F through the driven chain sprocket wheel 52 independently from the rear output shaft 4R through the sun gear 45, namely, the first output member, of the center-differential gear assembly 4. This power line gives the 4WD, differential-free drive mode.

If the shift switch 69 is placed at the 4WD-Diff-Locked drive mode selecting position between the 2WD drive mode selecting position and the 4WD-Diff-Free drive mode selecting position, the second clutch sleeve 44 of the second shift mechanism 17 is placed in position between the forward and rearward displaced positions so as to bring the fifth clutch ring 42 into spline engagement with both of the fourth and sixth clutch rings 41 and 43 as is shown in FIG. 6. Then the sun gear 45 and the carrier member 48 of the second planetary gear assembly, namely, the first and second output members of the center-differential gear assembly 4, are coupled together. In other words, the rear and front output shafts 4R and 4F are locked together. Due to this locking, the center-differential gear assembly 4 transmits driving power to both of the rear and front output shafts 4R and 4F without differential action therebetween. This power line gives the 4WD-Diff-Locked drive mode.

In operation of the power transmission of the preferred embodiment according to the present invention constructed as described above, the shift lever is manipulated by the driver in the driver's compartment to shift the transfer gear assembly 3 into a desired driving condition. When th shift lever is manipulated to select the high speed drive range, the shift control rod 71 is axially displaced forwardly or to the left side as viewed in FIG. 3. Consequently, the shift fork 78 moves the first clutch sleeve 39 to the illustrated position in FIG. 3, bringing it into spline engagement with the second clutch ring 32 spline-coupled to the carrier member 37. As a result, the transfer input shaft 11 is directly coupled to the second planetary gear assembly as the center-differential gear assembly 4 through the carrier member 37 of the first planetary gear assembly as the transfer gear assembly 3. Therefore, driving power is transmitted directly to the center-differential gear assembly 4 through the first planetary gear assembly without torque multiplication. In this way, the transfer gear assembly 3 is shifted into the high speed drive range; Hi.

On the other hand, when the shift lever is manipulated to select the low speed drive range Lo, the shift control rod 71 is axially moved rearwardly or to the right side viewed in FIG. 3. Consequently, the shift fork 78 of the sleeve member 76 slidably supported by the supporting rod 75, which is connected to the-connecting pin 74 of the shift control rod 71, is axially displaced to the right so as to place the second clutch sleeve 39 in spline engagement with the third clutch ring 33 operationally coupling together the input shaft 11 and the sun gear 34 of the first planetary gear assembly. In this way, the transfer gear assembly 3 is shifted into the low speed drive range Lo so as to transmit driving power with a torque multiplication from the transfer input shaft 11 of the transfer gear assembly 3 to the center-differential assembly 4 through the carrier member 37 with which the ring gear 47 of the second planetary gear assembly is formed.

In any drive range of the transfer gear assembly 3, the shift switch 69 of the switching board 68 may be operated by the driver in the driver's compartment to shift the centerdifferential gear assembly 4 into a desired drive mode. When the shift switch 69 is operated to select the 2WD mode while the transfer gear assembly 3 is maintained in the high speed drive range, Hi, the electric motor 61 is actuated to rotate, turning the shift control rod 63 through the reduction gear 62 so as to displace axially rearwardly the sleeve member 56 fixed to the guide rod 65 through the sliding engagement between the cam follower pin 57 and the cam groove 64. This axial movement of the sleeve member 56 causes the second sleeve clutch 44 engaged by the fork member 58 to be axially displaced to the right side as viewed in FIG. 3. Consequently, the clutch sleeve 44 is brought into spline engagement with the fourth clutch ring 41 as is shown in FIGS. 3 and 4 so as to couple together the fourth and fifth clutch rings 41 and 42, and hence the sun gear 45 and the pinion gears 46 of the second planetary gear assembly as the center-differential gear assembly 4. As a result, driving power is transmitted from the ring gear 47 of the second planetary gear assembly formed integrally with the carrier ring member 37 of the first planetary gear assembly as the transfer gear assembly 3 only to the rear output shaft 4R through the sun gear 45 as the first output member of the center-differential gear assembly 4. Due to this power line, the center-differential gear assembly 4 is placed in the 2WD mode, thereby the power transmission becomes ready for the two wheel, high speed range driving mode; 2WD-Hi.

When the shift switch 69 is operated to select the 4WD, differential-free drive mode while maintaining the transfer gear assembly 3 in the high speed drive range Hi, the electric motor 61 is then reversed, turning the shift control rod 63 in the opposite direction through the reduction gear 62 so as to axially forwardly displace the sleeve member 56 through the sliding engagement between the cam follower pin 57 and the cam groove 64. As the result of this axial movement of the sleeve member 56, the second clutch sleeve 44 engaged b the shift fork 58 is axially forwardly displaced to the left side as viewed in FIG. 3 and is brought into spline engagement with fifth and sixth clutch gears 42 and 43 so as to couple together the third and fourth sleeve shafts 20 and 21 as is shown in FIG. 5. As a result, because the carrier member 38 as the second output member of center-differential gear assembly 4 and the driving chain sprocket wheel 51 are locked together, the center-differential gear assembly 4 is shifted into 4WD mode. However, as is apparent from FIG. 5, the second clutch sleeve 44 is simultaneously placed out of engagement over the fourth clutch ring 41, shifting the center-differential gear assembly 4 into the differential-free drive mode; Diff-Free. The power transmission becomes ready for four wheel, high speed range, differential-free drive mode; 4WD-Hi-Free. In this drive mode, the center-differential gear assembly 4 drives both the rear and front axles at the same time but allows them to turn at different speeds when negotiating turns.

The shift switch 65 can select another drive mode, namely, 4WD, differential-locked drive mode; 4WD-Locked while maintaining the transfer gear assembly 3 in the high speed drive range; Hi. When the shift switch 65 is operated and placed at the 4WD-Locked drive mode selecting position, the electric motor 61 is actuated to rotate, turning the shift control rod 63 through the reduction gear 62 so as to axially move the sleeve member 56 rearwardly in a half way. The clutch sleeve 44 is brought into spline engagement with the three clutch rings, the fourth, fifth and sixth clutch rings 41 to 43, coupling the first and second output members of the center-differential gear assembly 4 and the driving chain sprocket wheel 51 all together so as to lock together the rear and front output shafts 4R and 4F as well as the first and second output members. Therefore, the centerdifferential gear assembly 4 is shifted into the 4WD, Diff-Locked drive mode to transmit driving power simultaneously to both of the rear and front output shafts 4R and 4F, driving them at the same time and allowing them to turn at the same speed. Thus, the power transmission becomes ready for four wheel, high speed drive range, differential-Locked drive mode; 4WD-Hi-Locked.

Figure 7:
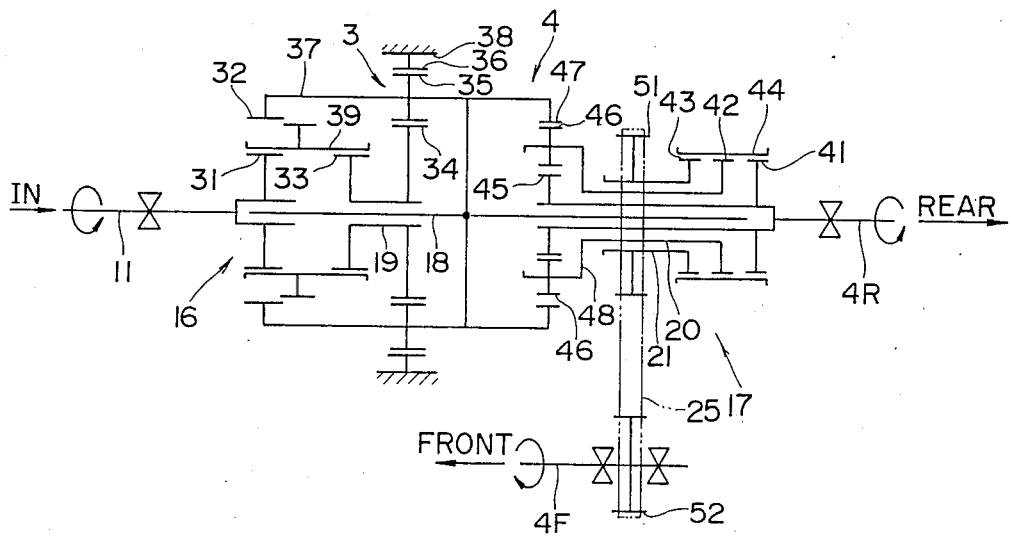
FIG. 7 is a skeleton diagram showing the power transmission which is in the 4WD-Lo-Diff-Locked drive mode.

The power transmission can be shifted into an additional drive mode, namely, 4WD-Lo-Diff-Free drive mode. If the shift lever is manipulated to select the low speed drive range, Lo, while maintaining the shift switch at the 4WD- Diff-Locked drive mode selecting position, the first clutch sleeve 39 of the first shift mechanism 16 is axially rearwardly displaced to the left from the position shown in FIG. 3, being brought into spline engagement with the clutch ring 33 integral with the sun gear 34 of the first planetary gear assembly as the transfer gear assembly 3 as is shown in FIG. 7. As a result, as was previously described, the transfer gear assembly 3 is shifted into the low speed drive range, Lo, driving power is transmitted with torque multiplication from the input shaft 11 of the transfer gear assembly 3 to the center-differential gear assembly 4. Then the power transmission becomes ready for four wheel, low speed range, differential-locked drive mode; 4WD-Lo-Locked.

In the above-described preferred embodiment of the present invention, because the transfer gear assembly 3 comprises the planetary gear assembly with its sun gear and the carrier member serving as input and output members, respectively, the transfer gear assembly 3 can produce a gear reduction of about more than 2:1. Therefore, the power transmission of this invention is quite favorable in the case that the vehicle is needed to be driven with a high driving torque such as when wheels are stuck in mire. Although, in the above-described embodiment, the transfer gear assembly 3 and the center-differential gear assembly 4 are coupled by integrally forming the carrier member 37 of the first planetary gear assembly and the ring gear member 47 of the second planetary gear assembly so as to allot driving torque to the front and rear output shafts 4F and 4R at shares 50 and 50 percent, it is permissible to couple them by connecting the carrier members 37 and 48 of the first and second planetary gear assemblies so as to allot driving torque to the front and rear output shafts 4F and 4R at shares, for example, 40 and 60 percent, 30 and 70 percent, or the like.

Although the invention has been described with respect to a preferred embodiment, changes and modifications are possible which do not depart from the spirit, scope and contemplation of the invention, and, therefore, such are deemed to fall within the purview of the present invention as claimed.

What is claimed is:

1. In a power transmission for a vehicle having front and rear wheel drive shafts laterally spaced from and located in parallel with each other, a transfer gear assembly which has a transfer input member coupled to an output shaft of a primary-transmission and a transfer output member and which is shiftable between a high and a low speed drive range, and a center-differential gear assembly which has a differential input member coupled to said transfer output member of said transfer gear, first differential output member coupled to said rear wheel drive shaft, and second differential output member and which is shiftable between two and four drive modes and between differential-free and differential-locked drive modes, the improvement comprising:
said transfer gear assembly comprised of a first planetary gear assembly having a sun gear as said transfer input member;
said center-differential gear assembly comprised of a second planetary gear assembly having a ring gear as said differential input member and being coaxially arranged with and adjacent to said first planetary gear assembly;
first shifting means disposed on one side of said first planetary gear assembly opposite to said second planetary gear assembly for shifting said transfer gear assembly between said high and low speed drive ranges; and
second shifting means disposed on one side of said second planetary gear assembly opposite to said transfer gear assembly for shifting said center-differential gear assembly between said two and four wheel driving modes and between said differential-free and differential-locked drive modes.

2. In a power transmission as defined in claim 1, wherein said first and second shifting means are disposed coaxially with both said transfer gear assembly and said center-differential gear assembly.

3. In a power transmission as defined in claim 1, wherein said transfer input and output members are a carrier member and a sun gear of said first planetary gear assembly.

4. In a power transmission as defined in claim 1, wherein said differential input member of said center-differential gear assembly is a ring gear of said second planetary gear assembly, said ring gear being formed integrally with a carrier member of said first planetary gear assembly.

5. In a power transmission as defined in claim 1, wherein said first and second differential output members are a sun gear and a carrier member, respectively, of said second planetary gear assembly.

6. In a power transmission as defined in claim 5, wherein said sun gear is integrally formed with said rear output shaft and said carrier member is mounted on said rear output shaft for rotation.

7. In a power transmission as defined in claim 6, wherein said second shifting mechanism comprises first to third clutch ring members which are coaxially arranged and a clutch sleeve member axially slidable to selectively engage with said first to third clutch ring members.

8. In a power transmission as defined in claim 7, wherein said first clutch ring member is fixed to said rear output shaft, said second clutch ring member is fixed to said carrier member, and said third clutch ring member is mounted on said rear output shaft for rotation.

9. In a power transmission as defined in claim 8, wherein said third clutch ring member is integrally formed with a driving chain sprocket wheel which is rotatably mounted on said rear output shaft and operationally connected to said front output shaft.

10. In a power transmission as defined in claim 9, wherein said carrier member has a sleeve portion mounted on said rear output shaft on which said driving chain sprocket wheel is mounted.

11. A power transmission for use on a vehicle equipped with four wheel drive having front and rear wheel drive shafts, comprising a transfer gear assembly having an output shaft, a center-differential gear assembly composed of a planetary gear assembly including an input member coupled to the output shaft of said transfer gear, a first output member for coupling to the rear wheel drive shaft, and a second output member; and a shift mechanism for shifting the center-differential gear assembly into different drive modes, namely, between two and four wheel drive modes and between differential-free and differential-locked drive modes, said shift mechanism including a first clutch ring member formed on said first output member of said center-differential gear assembly, a second clutch ring member formed on said second output member of said center-differential gear assembly, a third clutch ring member operationally coupled to said rear wheel drive shaft, said first to third clutch ring members being arranged coaxially with said center-differential gear assembly, and a clutch sleeve coupled to said second clutch ring member for axial movement to selectively engage with said first to third clutch ring members to shift said center-differential gear assembly between said different drive modes.

12. A power transmission as defined in claim 10, wherein said first output member is a sun gear of said planetary gear assembly which is formed integrally with said rear wheel drive shaft and said second output member is a carrier member of said planetary gear assembly which has a sleeve-like extension mounted on said rear output shaft for rotation.

13. A power transmission as defined in claim 11, wherein said third clutch ring is formed integrally with a driving chain sprocket wheel mounted on said sleeve-like extension of said carrier member for rotation and operationally connected to a driven chain sprocket wheel of said front output shaft.

* * * * *